United States Patent
Chiu et al.

(10) Patent No.: US 7,553,551 B2
(45) Date of Patent: Jun. 30, 2009

(54) PELLICLE FRAME

(76) Inventors: Ming-Lung Chiu, P.O. Box 108-00403, Taipei (TW) 106; Nien-Chen Li, P.O. Box 108-00403, Taipei (TW) 106

( * ) Notice: Subject to any disclaimer, the term of this patent is extended or adjusted under 35 U.S.C. 154(b) by 716 days.

(21) Appl. No.: 11/161,755

(22) Filed: Aug. 16, 2005

(65) Prior Publication Data

US 2006/0127691 A1 Jun. 15, 2006

(51) Int. Cl.
 B32B 15/08 (2006.01)
 B21C 27/00 (2006.01)
(52) U.S. Cl. .................. 428/626; 428/457; 428/632; 428/596; 428/45
(58) Field of Classification Search ............. 428/626, 428/422, 457, 652, 627, 630, 632, 650, 673, 428/596, 597, 598, 45, 44; 430/5, 6
See application file for complete search history.

(56) References Cited

U.S. PATENT DOCUMENTS 5,470,621 A * 11/1995 Kashida et al. ............... 428/14
6,406,573 B1 * 6/2002 Cerio ........................ 156/64
2004/0137339 A1 * 7/2004 Zhang et al. .................. 430/5
2005/0214655 A1 * 9/2005 Zimmerman et al. ........... 430/5

FOREIGN PATENT DOCUMENTS

EP 0 622 680 * 11/1994
JP 07-072617 * 3/1995

* cited by examiner

Primary Examiner—Timothy M Speer
(74) Attorney, Agent, or Firm—Ming Chow; Sinorica, LLC

(57) ABSTRACT

A pellicle frame for pellicle for use with a photomask in a wafer lithographic processing process is disclosed to have the frame body made of a material containing silver that absorbs sulfide released from other materials of the pellicle, preventing formation of crystals on the mask pattern of the photomask after exposure. In an alternate form, the pellicle frame is made of aluminum alloy, ceramics, or stainless steel, and then coated with a layer of silver and a black coating of polymer, for example, Teflon, PEEK (Polyaryletherketone) or PFA (Perfluoroalkoxy).

12 Claims, 9 Drawing Sheets

PELLICLE FRAME

This application claims the priority benefit of Taiwan patent application number of 093139030 filed on Dec. 15, 2004.

BACKGROUND OF THE INVENTION

1. Field of the Invention

The present invention relates to a pellicle and more particularly, to a pellicle frame, which has the frame body made of a material containing silver or coated with a layer of silver that absorbs sulfide released from other materials of the pellicle preventing formation of crystals on the mask pattern of the photomask after exposure.

2. Description of the Related Art

IC (Integrated Circuit) is one of the most important elements that construct the so-called "third wave revolution" or "information revolution". Computer, mobile phone, Internet, and LCD are important inventions of this digital era that greatly influence the living of human beings. Because IC chip has a wide application, it is used in a variety of electronic consumer products including computer and mobile phone. Following fast development of semiconductor technology, electronic products are designed to meet the requirements of modern electronic features such as light, thin, short, small, high speed, high frequency, high performance, and high precision. Heavy market demand for electronic products having modern electronic features promotes development of semiconductor technology towards this market trend. In consequence, investment in semiconductor industry keeps increasing in recent years. Every manufacturer is trying hard to create new technology in order to take the leading place in the market so as to enjoy huge commercial profit from the market. In order to survive from severe market competition, it is important to reduce the cost and to improve the efficiency in this semiconductor field.

Due to Moore's law, the successability of technical improvement toward smaller line width CD value is determined subject to photolithographic techniques, and scanner is the key implement. Currently, 248 nm deep-UV is intensively used for 0.11 μm photolithography. However, due to wavelength's sake, it is not possible to have the downward going line be in the way like 90 nm~65 nm. Further, the use of 248 nm deep-UV for 0.11 μm lithography requires the so-called PSM (phase shift mask) reticle, which is made of molybdenum (Mo) that is about 2~3 times over the price of chromium (Cr). In order to obtain a relatively smaller line width, the wavelength of the exposure machine should be relatively shorter. Therefore, 248 nm deep-ultraviolet light is intensively used to substitute for 365 nm ultraviolet. Recently, there are manufacturers studying the use of 193 nm deep-ultraviolet photoresist and light source of ultra short wave (Argon fluoride excimer laser to generate 193 nm deep-ultraviolet light) to improve lithographic process to the stage of 0.13 μm~65 nm.

However, when using a photomask, it is provided with a pellicle to protect against top contaminant and bottom contaminant. If a photomask is used without a pellicle, adhesion of contaminants greater than the line-width of the electronic circuits of the mask pattern will destruct the function of the original circuit design. A pellicle comprises a pellicle frame and pellicle films provided at the top side of the pellicle frame and respectively adhered to the top and bottom sides of the photomask by means of adhesive means. Further, the inner side of the pellicle frame is coated with a layer of adhesive means for adhering contaminant in the enclosed space within the pellicle films and the pellicle frame so that the photomask pattern is protected against contaminants. It is well know that ArF lithography process ammonium sulfate crystals or haze will be generated on photomask surface. The ammonium sulfate comes from reaction of ammonia and sulfur oxides by the acceleration of 193 nm light energy. The source of ammonia may come from the environmental or the pellicle. The source of sulfur oxides may come from the environmental and the mask surface. The amount of the crystals will be increased and the accumulated crystals will become not transparent following the increasing of UV exposure, and such crystals will block light from passing through the photomask, resulting in a distortion of photomask pattern. This is a severe problem of the conventional pellicles.

Further, current semiconductor manufacturers commonly use SMIF system provided by Hewlett-packard for storing and transporting wafers/masks, i.e., the so-called enclosed transfer container. SMIF system is designed to reduce particle flux in storage and transport of semiconductor products during a semiconductor manufacturing process. This objective is achievable by: keeping the air proximity to the wafer or mask from change relative to the wafer or mask during storage and transport so as to prevent passing of particles from the surroundings into the air proximity to the wafer or mask. SMIF system uses a small amount of particle-free air to provide a clean environment for the object where the movement and flowing direction of the air and pollutant are well controlled. This measure greatly reduces the cost for clean room. Under the employment of SMIF system, the clean room of the foundry is maintained at Class 100, and the fabrication equipments are controlled to be under Class 0.1. Every fabrication equipment has a gate for the access of wafers/photomask, and enclosed transfer containers are used to transfer wafers/photomask. This method greatly reduces clean room installation cost and maintenance cost.

Further, before using 193 nm deep-UV to run a lithographic process, as shown in FIG. 1, a photomask A and a pellicle B are stored in an enclosed storage container D. When in use, the photomask A and the pellicle B are taken out of the enclosed storage container D and put in a mini-environment, and then radiated with 193 nm deep-UV. At this time, harmful crystals C are formed on the surface of the photomask A and the pellicle B (see FIG. 3). These crystals C lower the transmittance of the photomask A and the pellicle B, thereby resulting in distortion of the circuit pattern on mask and low yielding rate. Sometimes, the whole lot of wafers becomes unusable. This problem is indeed serious. This problem is also seen in the old manufacturing process with 365 nm ultraviolet light. However, because the old manufacturing process employs a relatively longer wavelength that has a relatively lower energy to provide a relatively lower capacity, the transparency of crystals formed on photomask after radiation is still high enough, and the problem of crystal formation on photomask during running of the old manufacturing process is never so serious to obstruct the product. According to experimentation, the transmittance of crystals formed on wafers after radiation with 365 nm is 76.1%; the transmittance of crystals formed on photomask after radiation with 248 nm is 29.2%, which is approximately the limit; the transmittance of crystals formed on wafers after radiation with 193 nm is 13%, which is about the opaque status. If this problem is not settled, semiconductor manufacturing process will be limited to 0.11 μm, and the unit transistor capacity will not be doubled as within 18 months as expected subject to Moore's law.

According to Example I in FIG. 2, the photomask A and the pellicle B were kept in an enclosed plastic storage container D at 40° C. for 3 days, and then the photomask A and the pellicle B were taken out of the enclosed plastic storage container D and put in a mini-environment and radiated with 193 nm deep-UV, and crystals C were found on the surface of the photomask A and the pellicle B. According to Example II in FIG. 2, the photomask A and the pellicle B were put in an enclosed plastic storage container D at 40° C. for 3 days, and then the photomask A was taken out of the enclosed plastic storage container D and put in a mini-environment and radiated with 193 nm deep-UV, and crystals C were found on the surface of the photomask A. According to Example III in FIG. 2, the photomask A and the pellicle B were put in an enclosed stainless steel storage container D at 40° C. for 3 days, and then the photomask A and the pellicle B were taken out of the enclosed stainless steel storage container D and put in a mini-environment and radiated with 193 nm deep-UV, and no crystal C formation was seen on the surface of the photomask A and the pellicle B. This study shows crystal formation has a great concern with the storage container, and pellicle frame will affect distribution of crystals on the glass and mask pattern of the photomask.

A pellicle is to be used to protect the mask pattern of a photomask against contaminants, preventing damage to the electronic circuits. However, the material of the pellicle frame and the surroundings provide a gas containing organic or inorganic sulfide that causes growth of crystals on the mask pattern. Observation shows distribution of crystals around the pellicle frame. According to the aforesaid Example II, even distribution of crystals can be observed. Therefore, preventing formation of crystals on the mask pattern requires improvement of the material for pellicle According to study, we wound the reasons of crystal formation as follows.

1. According to analysis, the chemical formula of the crystals formed on the photomask and the pellicle is $(NH_4)_2SO_4$, mainly composed of $(NH_4)^+$ and $(SO_4)^{2-}$. During synthesis, there are important catalysts: (a) light source of short wavelength and high energy, (b) organic or inorganic gas, (c) environment humility.

2. Either the use of Krypton fluoride excimer laser to generate 248 nm deep-ultraviolet light or Argon fluoride excimer laser to generate 193 nm deep-ultraviolet light, the narrow pulse light has a high energy that is continuously supplied during photolithography, which causes crystal formation upon its radiation on the photomask. It shows that the shorter the wavelength is, the higher the energy and the lower the transmittance of crystal will be.

3. In order to obtain high transmittancy of the pellicle, polymer of thickness below 0.002 mm is used for the film of the pellicle, which provides little insulation effect to gasses of relatively smaller molecules, and allows passing of wet air (water molecule) from the outside clean room into the inside of the pellicle to provide element requisite for its chemical reaction, and therefore crystals will be formed on the surface of the photomask and the pellicle after radiation with 193 nm deep-UV.

4. The material of the pellicle itself releases harmful gas in the enclosed space around the mask pattern thereby causing formation of crystals on the photomask and the pellicle after radiation with 193 nm deep-UV.

5. Because the pellicle frame is made of aluminum alloy treated with a sulfuric acid anodizing process, a porous membrane layer of capillaries is formed on the surface of the pellicle frame, and a big amount of sulphate ion $(SO_4)^{2-}$ will be left on the surface of the pellicle frame, thereby increasing the concentration of sulfur molecules in the enclosed space between the chrome surface and the film upon evaporation of sulphate ion $(SO_4)^{2-}$, and further causing crystal formation on the photomask and the pellicle after radiation of the photomask and the pellicle with 193 nm deep-UV.

FIG. 4 is a schematic drawing, showing the use of a pellicle according to the prior art. As illustrated, light from a stepper passes through the photomask A and the pellicle B, causing the lens system F to map the image of the mask pattern E onto the image plane (photoresistant) H of the wafer G. In case the particle size of the crystals C or particles is smaller than the maximum tolerable size of the focal depth, the crystals or particles mean no harm. However, the crystals will grow with time and accumulation of exposure. If the growth of the crystals surpasses the maximum tolerable size of the focal depth, the crystals will affect the exposure.

SUMMARY OF THE INVENTION

The present invention has been accomplished under the circumstances in view. It is therefore the main object of the present invention to provide a pellicle frame, which contains silver that absorbs sulfide, preventing formation of crystals on the mask pattern of the photomask after exposure. According to one embodiment of the present invention, the pellicle frame is made of silver or material containing silver. The pellicle frame may be further coated with a black coating of polymer to eliminate light. According to an alternate form of the present invention, the pellicle frame is made of aluminum alloy, ceramics, or stainless steel, and then coated with a layer of silver and a black coating of polymer on the layer of silver instead of the conventional sulfuric acid anodizing treatment.

DETAILED DESCRIPTION OF THE PREFERRED EMBODIMENT

Figure 1:
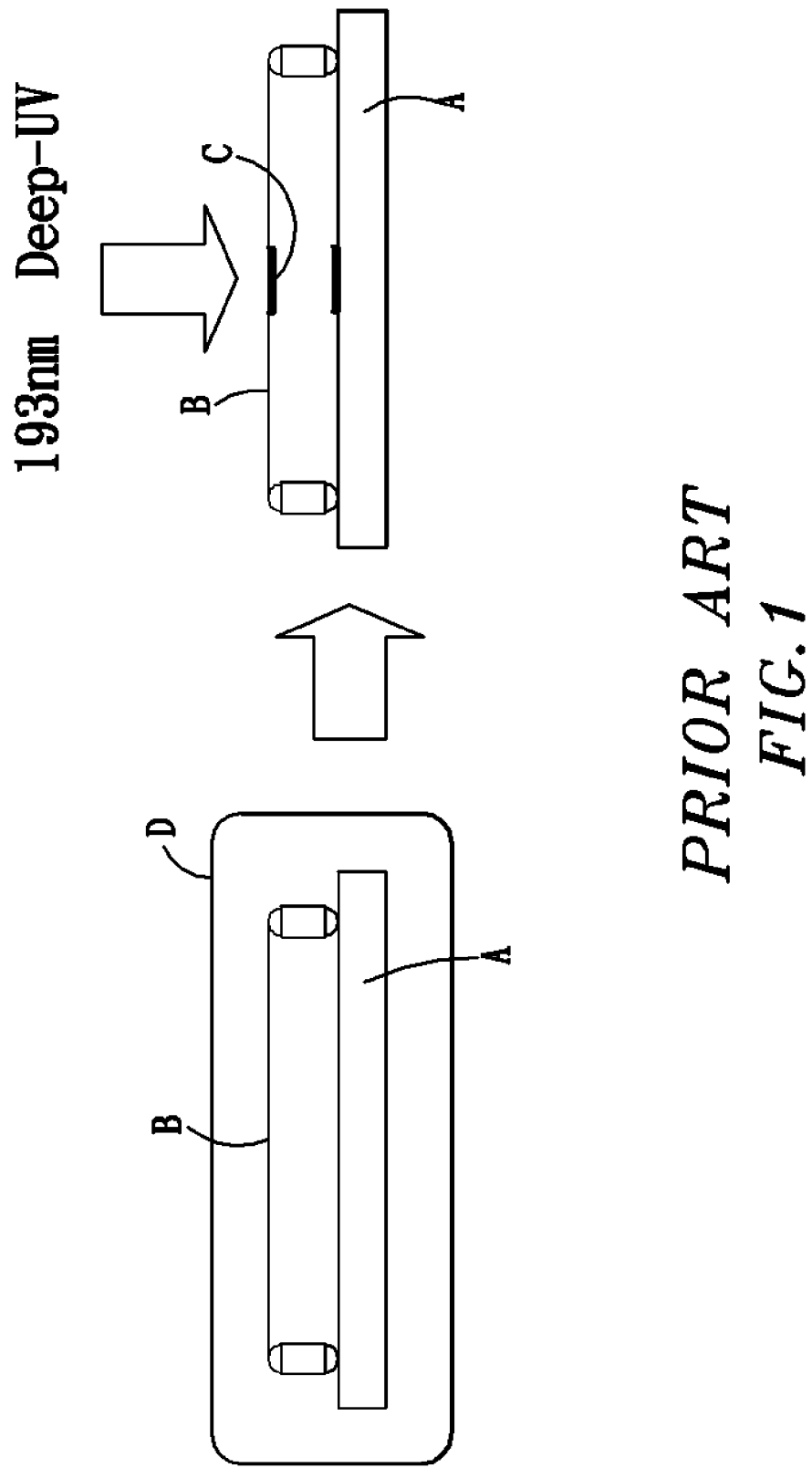
FIG. 1 is a schematic drawing showing a 193 nm deep-ultraviolet exposure bake process according to the prior art (I).
Figure 2:
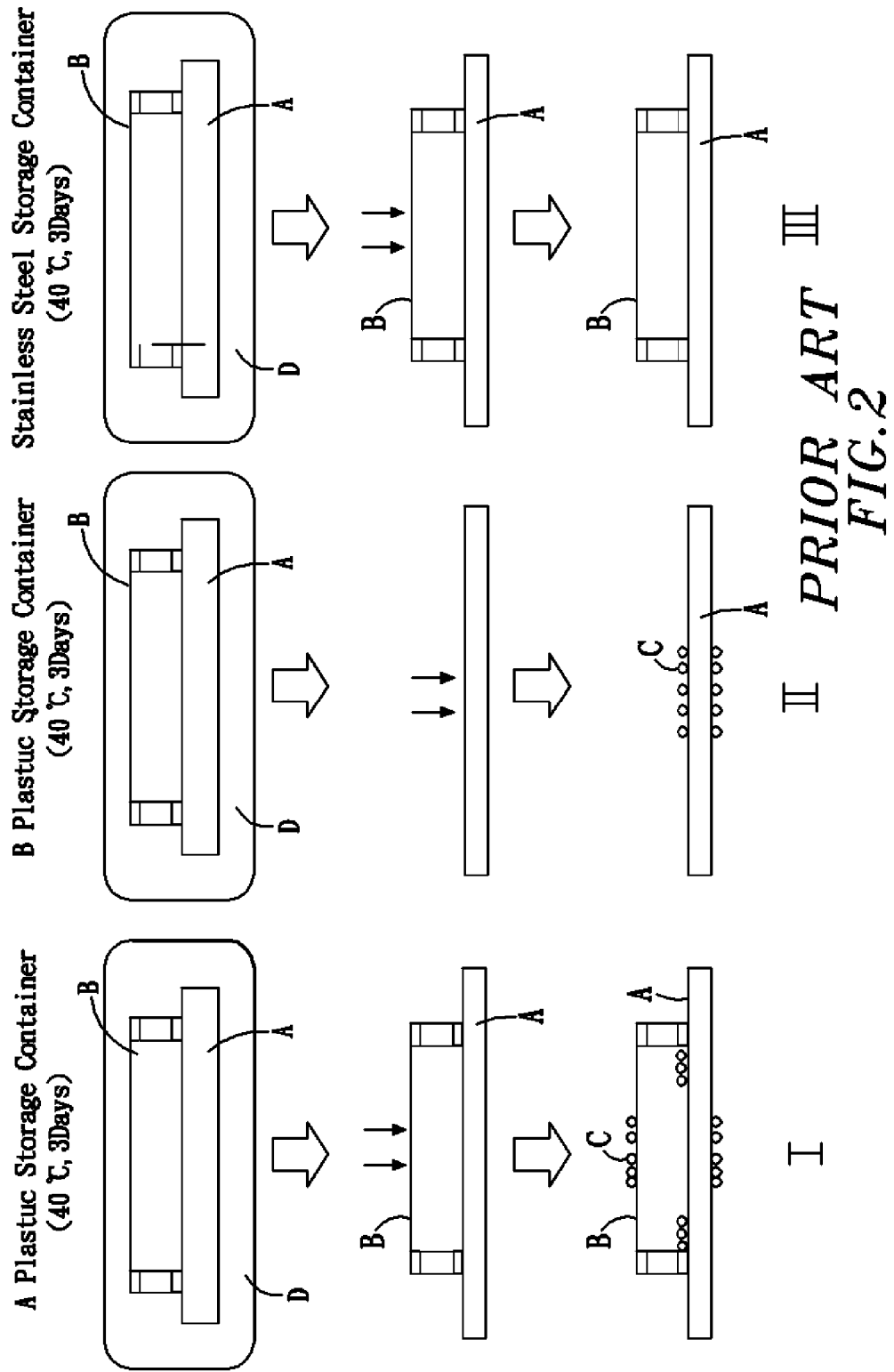
FIG. 2 is a schematic drawing showing a 193 nm deep-ultraviolet exposure bake process according to the prior art (II).
Figure 3:
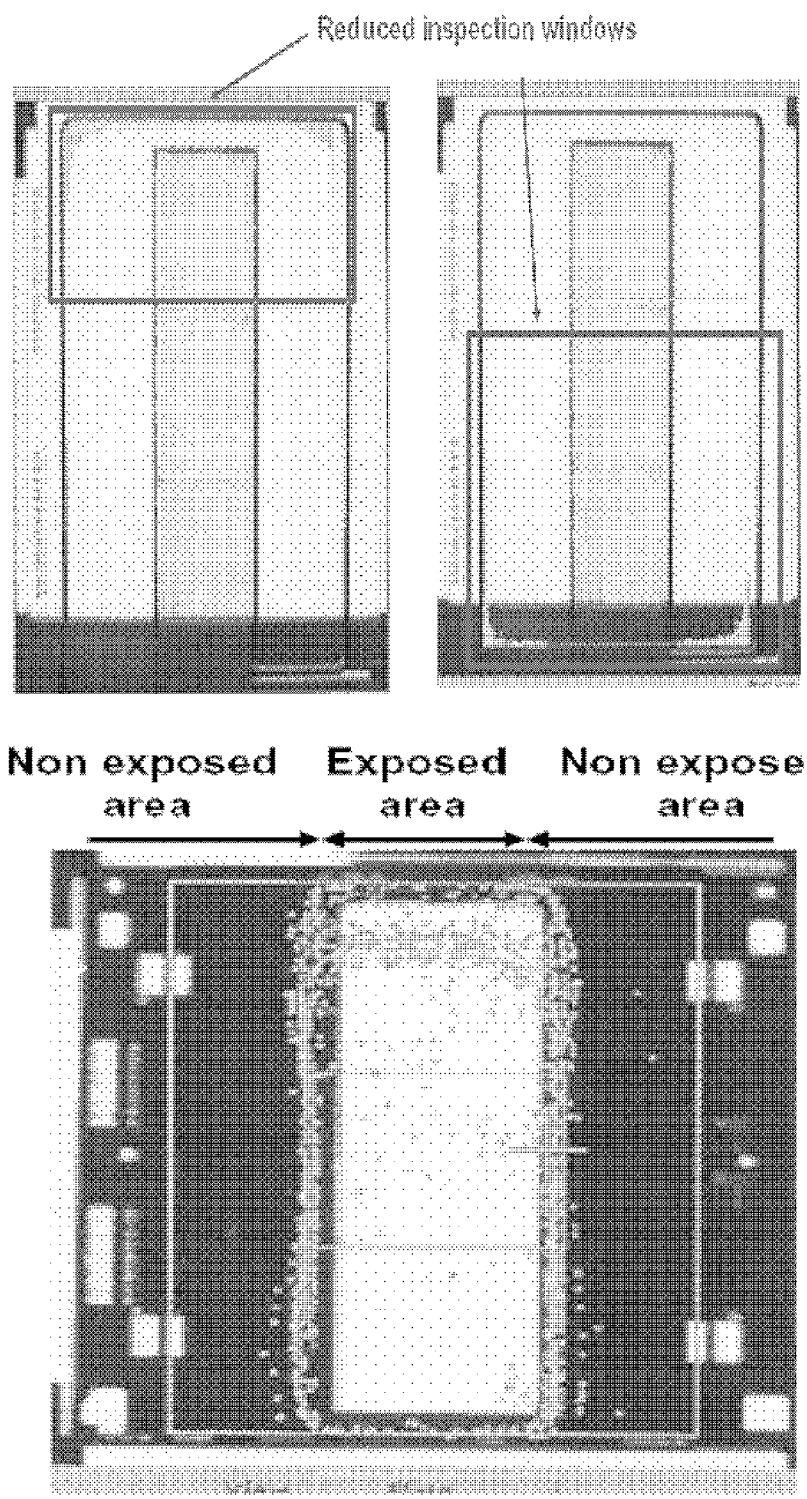
FIG. 3 is a schematic drawing showing crystal formation on a photomask.
Figure 4:
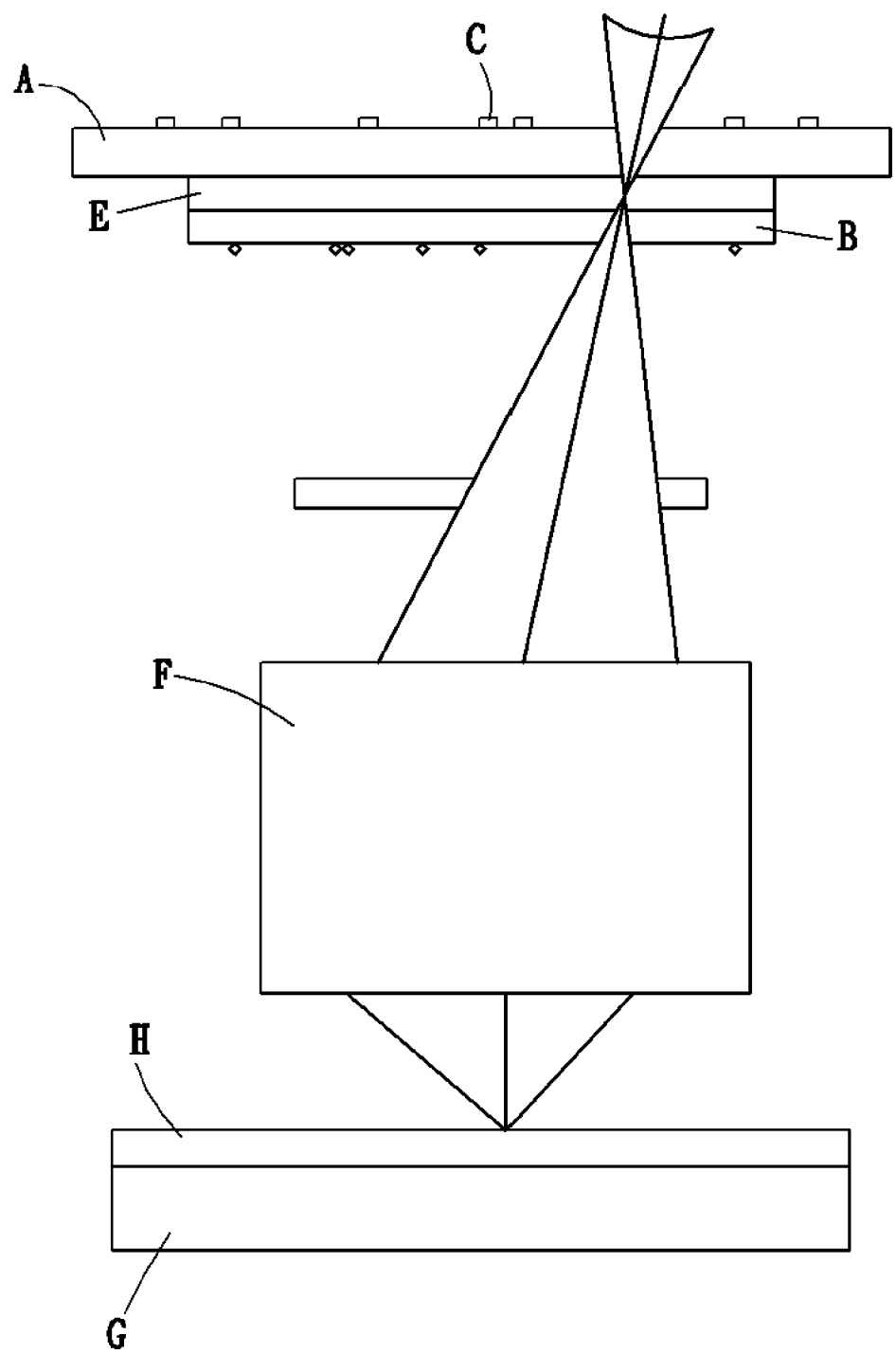
FIG. 4 is a schematic drawing showing the use of a pellicle according to the prior art.
Figure 5:
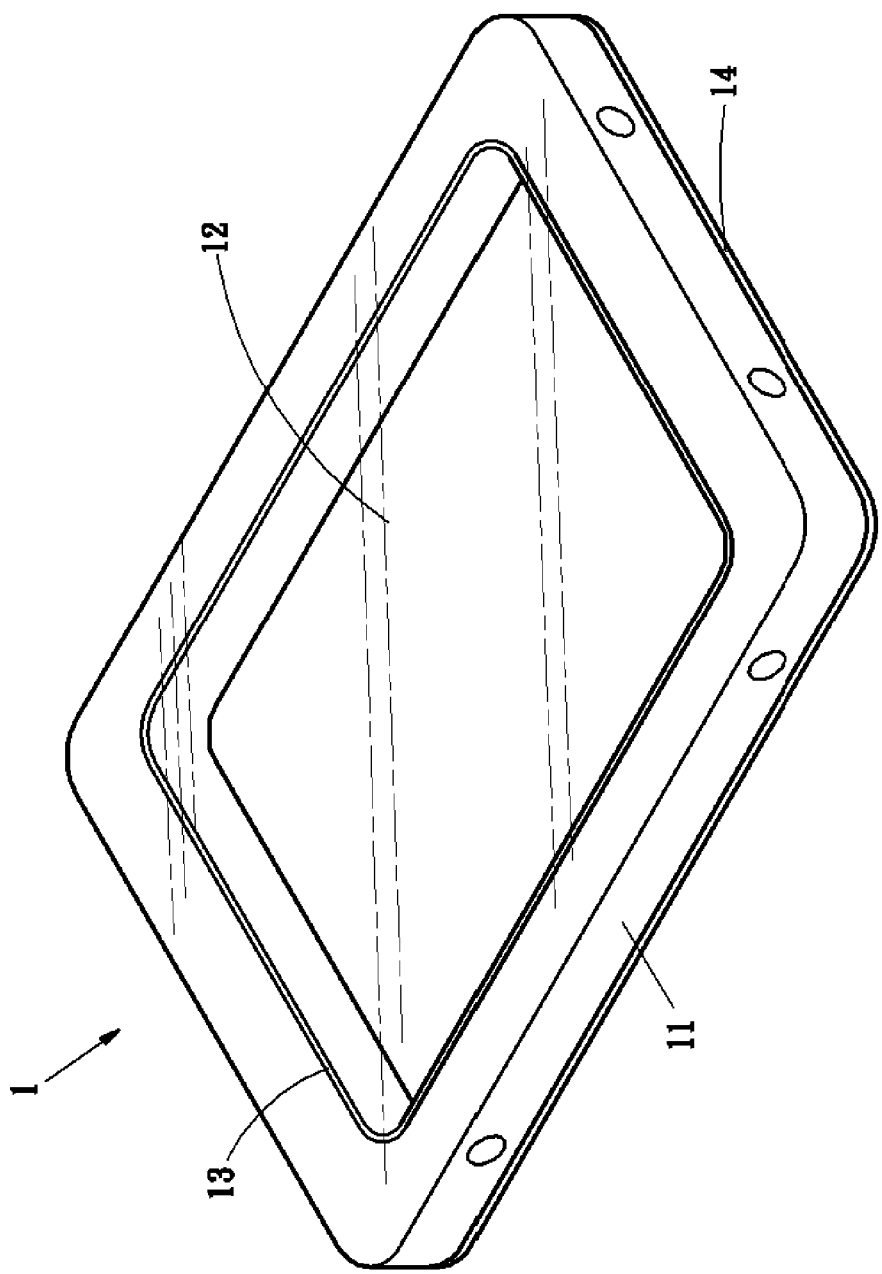
FIG. 5 is a perspective view of a pellicle according to the present invention.

Referring to FIG. 5, a pellicle 1 in accordance with the present invention is shown comprising a pellicle frame 11, a pellicle film 12 provided at the top side of the pellicle frame 11, a layer of adhesive coating 13 covered on the inside wall of the pellicle frame 11, and a mounting adhesive 14 provided at the bottom side of the pellicle frame 11 for securing the pellicle frame 11 to a photomask. Further, the pellicle frame 11 has dismounting holes spaced around the periphery.

Figure 6:
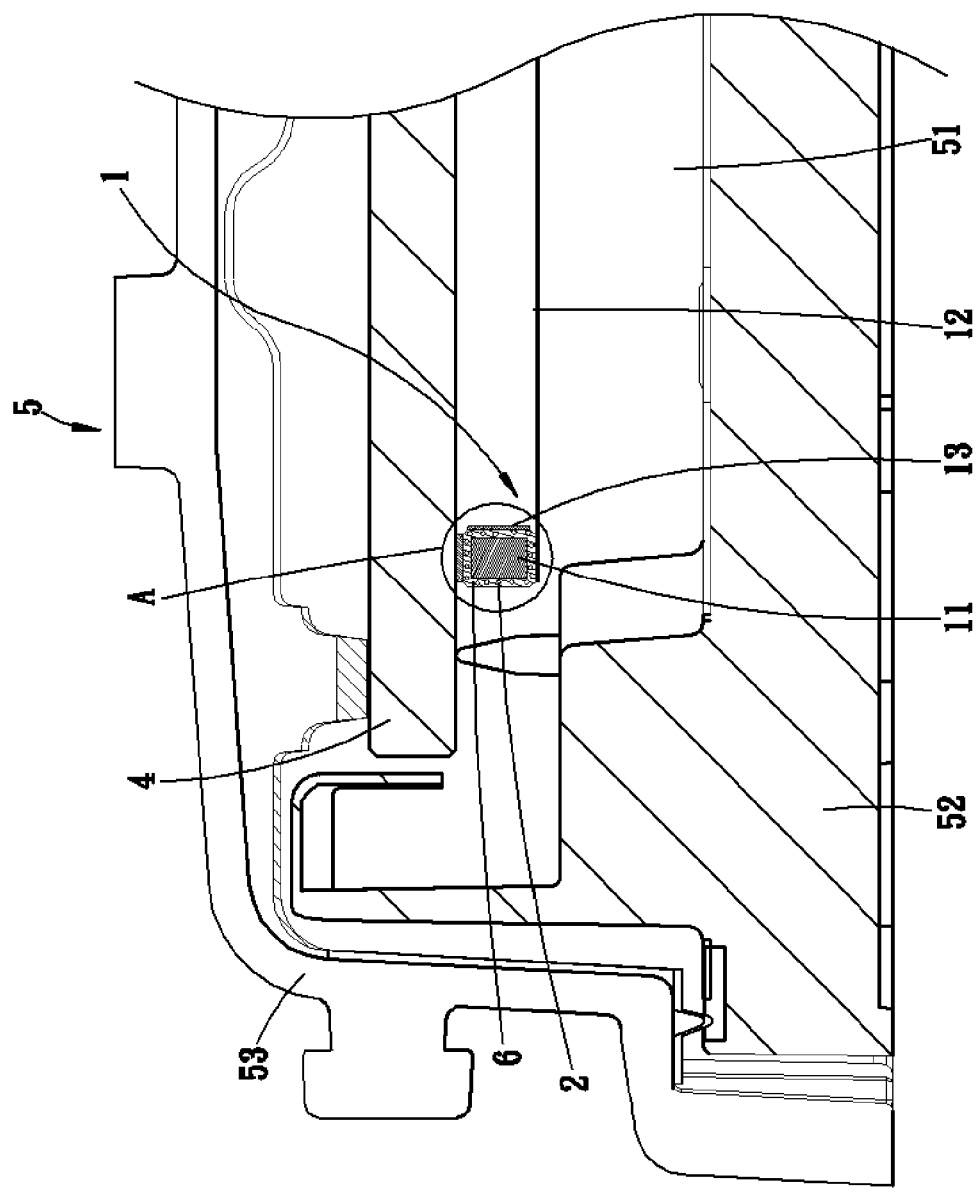
FIG. 6 is a schematic drawing showing the drawback of the prior art pellicle.
Figure 6A:
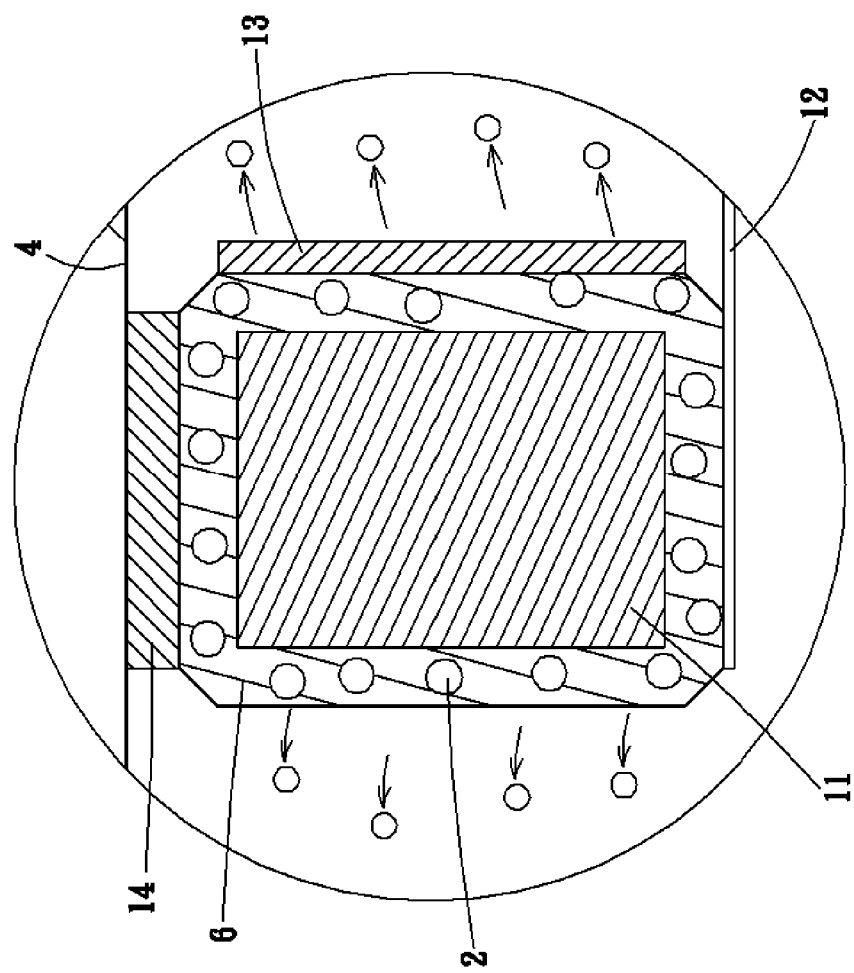
FIG. 6A is a sectional view in an enlarged scale of a part of FIG. 6.

The pellicle frame 11 according to conventional designs is made from aluminum alloy through a sulfuric acid anodizing process. Because of the sulfuric acid anodizing process, a porous coating 6 of thickness about 0.02 mm is covered over the surface of the pellicle frame 11 that contains a certain amount of sulfide 2 (see FIGS. 6 and 6A). After finish of the pellicle 1, sulfide 2 is continuously vaporized from the porous coating 6 of the pellicle frame 11. During the use of the pellicle 1 with a photomask 4 in an optical projection system to map a mask pattern on the image plane of a wafer, released sulfide 2 causes formation of crystals on the mask pattern of the photomask 4 and the pellicle film 12. In order to eliminate the formation of crystals, the invention uses silver alloy for the pellicle frame 11. Alternatively, the pellicle frame 11 can be made by aluminum alloy and then coated with a layer of silver 3 (see FIGS. 7 and 7A). Because the invention eliminates sulfuric acid anodizing process, the finished pellicle 1 does not release sulfide 2, preventing formation of crystals on the pellicle film 12 and the mask pattern of the photomask 4 with which the pellicle 1 is used. Further, the silver 3 absorbs sulfide 2 released from the adhesive coating 13 or the mounting adhesive 14, preventing growth of crystals on the mask pattern of the photomask 4 and the pellicle film 12.

In order to prevent reflection of light, the surface of the pellicle frame 11 is preferably made in black color. Further, contaminants at a black surface can easily be seen. However, when coated the pellicle frame 11 with a layer of silver 3, the surface of the pellicle frame 11 shows a silver color that reflects light. One of the following measures may be employed.

1. Spray-painting the inner surface of the silver coated pellicle frame 11 and a part of lateral of adhering the pellicle film 12 with a black coating of polymers.

2. Spray-painting the whole surface of the silver coated pellicle frame 11 with a black coating of polymers.

3. Directly spray-painting the whole surface of the pellicle frame 11 with a black coating of polymers of organic/inorganic concentration below 5 ppm.

Referring to FIGS. 7 and 7A again, the pellicle 1 is adhered to the photomask 4 and put with the photomask 4 into an enclosed storage space 51 of an enclosed transfer container 5, which comprises a container base 52 and a top cover 53. The enclosed transfer container 5 is used to transfer the photomask 4 with the pellicle 1 to different wafer steppers for wafer lithographic processing process.

In order to facilitate closing/opening of the top cover 53 subject to SMIF (Standard Mechanical Interface) definitions, the locking force that locks the top cover 53 to the container base 52 is limited. Further, because there is a manufacturing tolerance from deformation, the airtight condition of the enclosed storage space 51 will become worse with the use of the enclosed transfer container 5, and external sulfide 2 will permeate into the enclosed storage space 51 of the enclosed transfer container 5 gradually, causing formation of crystals on the pellicle 1 and the mask pattern and glass of the photomask 4 in different shapes and arrangements. Therefore, the invention has the surface of the pellicle frame 11 covered with a layer of silver 3 to absorb sulfide 2 released from the pellicle 1, the photomask 4 and the enclosed transfer container 5, providing a safety environment to the pellicle 1, the photomask 4 and the wafers.

The pellicle frame 11 of the pellicle 1 can be made of aluminum alloy and coated with a layer of silver 3. Alternatively, the pellicle frame 11 of the pellicle 1 can be directly made of silver 3. Alternatively, the pellicle frame 11 of the pellicle 1 can be made of aluminum alloy, then coated with a layer of silver 3, and then spray-painted with a layer of black polymers. Alternatively, the pellicle frame 11 of the pellicle 1 can be made from ceramics, then coated with a layer of silver 3, and then spray-painted with a layer of black polymers. Alternatively, the pellicle frame 11 of the pellicle 1 can be made of stainless steel, then coated with a layer of silver 3, and then spray-painted with a layer of black polymers.

The aforesaid polymers can be PEEK (Polyarylerketone), PFA (Perflroroalkoxy), or Teflon®.

As indicated above, the technical features of the present invention to prevent crystallization on wafers/masks are as follows.

1. Silver is directly used to make the pellicle frame or to coat the surface of the pellicle frame so that the pellicle frame can absorb released sulfide from the pellicle, preventing crystallization on the mask pattern of the photomask after exposure.

2. The silver material of the pellicle absorbs released sulfide from the pellicle, the photomask and the enclosed storage space of the enclosed transfer container, preventing crystallization on the mask patter of the photomask after exposure 3. By means of coating the pellicle frame with a layer of polymers having low inorganic content such as sulfide or phosphide instead of conventional sulfuric acid anodizing treatment, the invention eliminates the problem of high concentration of sulfate ions.

4. By means of coating the pellicle frame with a layer of silver and then coating the silver with a layer of black polymers, the pellicle frame absorbs released sulfide and light.

Figure 7:
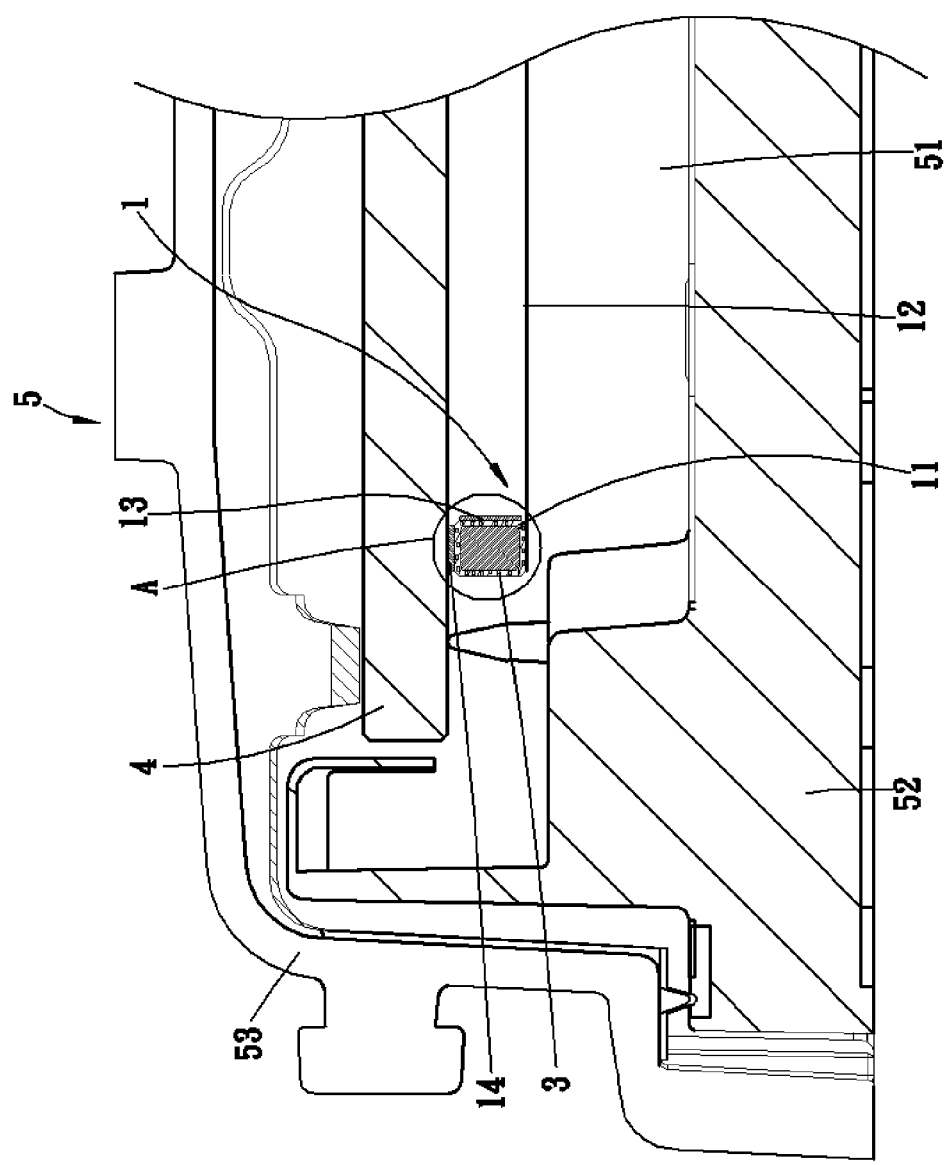
FIG. 7 is a sectional view of a part of the pellicle according to the present invention.
Figure 7A:
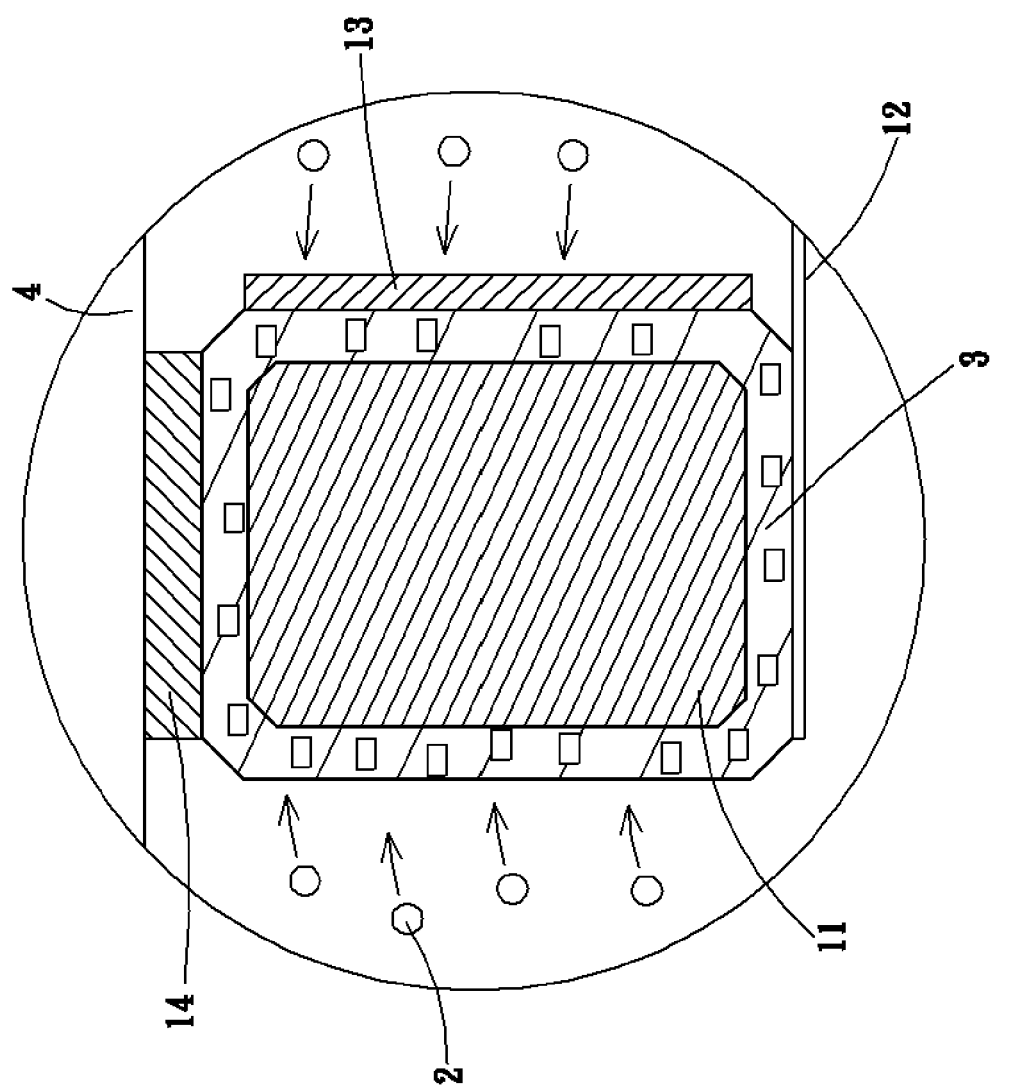
FIG. 7A is a sectional view in an enlarged scale of a part of FIG. 7.

A prototype of pellicle frame has been constructed with the features of FIGS. 7 and 7A. The pellicle functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pellicle frame, comprising a frame body, the characteristic in that:
   a black coating of polymer covered on the surface of said pellicle frame; and
   said frame body, which is made of a material containing silver.

2. The pellicle frame as claimed in claim 1, wherein the material of said frame body is metal alloy containing silver.

3. The pellicle frame as claimed in claim 1, wherein the material of said frame body is an aluminum alloy containing silver.

4. The pellicle frame as claimed in claim 1, wherein the material of said frame body is ceramic material containing silver.

5. The pellicle frame as claimed in claim 1, wherein the material of said frame body is stainless steel containing silver.

6. A pellicle frame, comprising:
   a frame body;
   a silver, which is covered on the surface of said frame body; and
   a black coating of polymer covered on said silver.

7. The pellicle frame as claimed in claim 6, wherein the material of said frame body is made of aluminum alloy, and said silver is electroplated on the surface of said frame body.

8. The pellicle frame as claimed in claim 6, wherein the material of said frame body is made of ceramics, and said silver is coated on said frame body by sputtering.

9. The pellicle frame as claimed in claim 6, wherein the material of said frame body is made of stainless steel, and said silver is coated on said frame body by electroplating.

10. The pellicle frame as claimed in claim 6, wherein the material of said polymer is TEFLON®.

11. The pellicle frame as claimed in claim 6, wherein the material of said polymer is PEEK (Polyaryletherketone).

12. The pellicle frame as claimed in claim 6, wherein the material of said polymer is PFA (Perfluoroalkoxy).

* * * * *